United States Patent [19]

Takamura et al.

[11] Patent Number: 4,660,138
[45] Date of Patent: Apr. 21, 1987

[54] MULTIPLE OUTPUT MULTIPLE STEP-UP RECTIFIER CIRCUIT

[75] Inventors: Yoshio Takamura; Akira Nakajima, both of Yokohama, Japan

[73] Assignee: Kabushiki Kaisha Toshiba, Kawasaki, Japan

[21] Appl. No.: 776,802

[22] Filed: Sep. 17, 1985

[30] Foreign Application Priority Data

Sep. 28, 1984 [JP] Japan ............................... 59-203578

[51] Int. Cl.[4] ............................................. H02M 7/10
[52] U.S. Cl. ....................................... 363/61; 307/34; 363/69
[58] Field of Search ................... 363/59–61, 363/69; 307/34

[56] References Cited

U.S. PATENT DOCUMENTS 2,619,602 11/1952 Walker et al.
3,467,849 9/1969 Wilson .................................. 363/61

FOREIGN PATENT DOCUMENTS 59-149772 8/1984 Japan.
59-194667 11/1984 Japan.

OTHER PUBLICATIONS

Longacre, "Voltage Doubles Power Microprocessor PROMs," Electr., vol. 49, No. 19, p. 105, Sep. 16, 1976.

Handbook of Rectifier Circuits, issued 1980, FLLIS Horwood Co., Ltd.

Primary Examiner—William H. Beha, Jr.
Attorney, Agent, or Firm—Oblon, Fisher, Spivak, McClelland & Maier

[57] ABSTRACT

In a multiple output multiple step-up rectifier circuit of the invention, an output voltage of a power source circuit is supplied to a plurality of Crockroft-Walton multiple step-up rectifier circuits connected in parallel with each other. The capacitor capacitance ratio of the rectifier circuits is proportional to the ratio of the numbers of multiplication stages of respective rectifier circuits. Particularly, when the squares of the number of multiplication stages is comparatively large, the capacitor capacitance ratio is set to be proportional to $n1^2/n2^2$ where $n1$ and $n2$ are the numbers of multiplication stages of two rectifier circuits of the plurality of rectifier circuits. When the number of multiplication stages is small, the capacitor capacitance ratio is set to be proportional to:

$$(2n1^2/3 + n1/2 - 1/6)/(2n2^2/3 + n2/2 - 1/6).$$

The power source circuit can change its output voltage such that the output of any of the plurality of rectifier circuits is the same in the non-load and load states.

9 Claims, 1 Drawing Figure

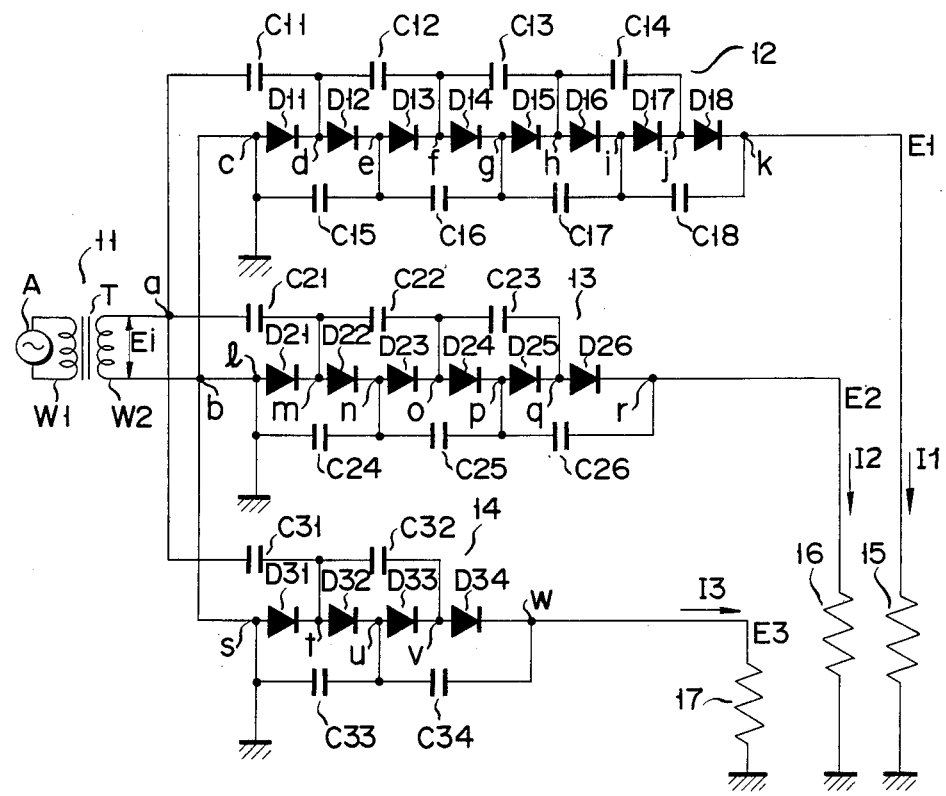

4,660,138

MULTIPLE OUTPUT MULTIPLE STEP-UP RECTIFIER CIRCUIT

BACKGROUND OF THE INVENTION

The present invention relates to a multiple output multiple step-up rectifier circuit wherein a plurality of Cockroft-Walton rectifier circuits are combined to obtain different voltages or currents therefrom.

A Cockroft-Walton multiple step-up rectifier circuit is conventionally used as a means for efficiently obtaining a high DC voltage. In the rectifier circuit of this type, an output voltage varies in accordance with a variation in the load current. As a result, when input terminals of a plurality of Cockroft-Walton multiple step-up rectifier circuits having an arbitrary number of multiplication stages are connected in parallel with each other to a single AC power source to obtain different voltages or currents from output terminals of the rectifier circuits, variations in load currents are different from each other, and the voltage ratio at the output terminals varies. In the above-mentioned circuit configuration, separate controlling means are required for the respective rectifier circuits to stabilize the voltage ratio at the output terminals, resulting in a complex circuit configuration.

SUMMARY OF THE INVENTION

It is an object of the present invention to provide a multiple output multiple step-up rectifier circuit wherein input terminals of a plurality of Cockroft-Walton multiple step-up rectifier circuits having an arbitrary number of multiplication stages are connected in parallel with each other to a single AC power source so that, when different voltages or currents are derived from output terminals of the respective rectifier circuits, the voltage ratio at the output terminals is constant both in load and non-load states without making the circuit configuration complex, thereby easily stabilizing the output voltages or currents.

According to one aspect of the present invention, there is provided a multiple output multiple step-up rectifier circuit comprising a power source circuit for generating an AC voltage, and a plurality of Cockroft-Walton multiple step-up rectifier circuits connected in parallel with each other to said power source circuit and each constituted by a combination of a plurality of diodes and capacitors of the number corresponding to an arbitrary number of multiplication stages, wherein a capacitance ratio of capacitors constituting any two rectifier circuits of said plurality of rectifier circuits is set to be proportional to the ratio of the squares of the numbers of stages of said two rectifier circuits.

BRIEF DESCRIPTION OF THE DRAWING

The FIGURE shows a multiple output multiple step-up rectifier circuit according to an embodiment of the present invention.

DETAILED DESCRIPTION OF THE PREFERRED EMBODIMENT

An embodiment of the present invention will be described with reference to the accompanying drawing.

The drawing shows a configuration of a multiple output multiple step-up rectifier circuit of the present invention. An AC power source A is connected to a primary winding W1 of a transformer T to constitute a power source circuit 11. The power source A can arbitrarily change the output voltage. Terminals a and b at two ends of a secondary winding W2 of the transformer T are AC voltage output terminals. First to third Cockroft-Walton multiple step-up rectifier circuits 12 to 14 are connected in parallel with each other to the terminals a and b.

The first rectifier circuit 12 is constituted by diodes D11 to D18 and capacitors C11 to C18 having the same capacitance. The diodes D11 to D18 are connected in series so as to have the same rectifying directions. Reference symbol c denotes an anode of the diode D11 of the diode series circuit having the diodes D11 to D18; d to j, connecting points among the diodes D11 to D18; and k, a cathode of the diode D18. The anode c is connected to the terminal b of the secondary winding W2 and at the same time grounded. The point d is connected to the terminal a of the secondary winding W2 through the capacitor C11. The point f is connected to the point d through the capacitor C12. The point h is connected to the point f through the capacitor C13. The point j is connected to the point h through the capacitor C14. The point e is connected to the anode c through the capacitor C15. The point g is connected to the point e through the capacitor C16. The point i is connected to the point g through the capacitor C17. The cathode k is connected to the point i through the capacitor C18 and at the same time connected as an output terminal to a load resistor 15.

The second rectifier circuit 13 is constituted by diodes D21 to D26 and capacitors C21 to C26 having the same capacitance. The diodes D21 to D26 are connected in series so as to have the same rectifying directions. Reference symbol l denotes an anode of the diode D21 of the diode series circuit having the diodes D21 to D26; m to q, connecting points among the diodes D21 to D26; and r, a cathode of the diode D26. The anode l is connected to the terminal b of the secondary winding W2 and also grounded. The point m is connected to the terminal a of the secondary winding W2 through the capacitor C21. The point o is connected to the point m through the capacitor C22. The point q is connected to the point o through the capacitor C23. The point n is connected to the anode l through the capacitor C24. The point p is connected to the point n through the capacitor C25. The cathode r is connected to the point p through the capacitor C26 and also connected as an output terminal to a load resistor 16.

The third rectifier circuit 14 is constituted by diodes D31 to D34 and capacitors C31 to C34 having the same capacitance. The diodes D31 to D34 are connected in series so as to have the same rectifying directions. Reference symbol s denotes an anode of the diode D31 of the diode series circuit having the diodes D31 to D34; t to v, connecting points among the diodes D31 to D34; and w, a cathode of the diode D34. The anode s is connected to the terminal b of the secondary winding W2 and also grounded. The point t is connected to the terminal a of the secondary winding W2 through the capacitor C31. The point v is connected to the point t through the capacitor C32. The point u is connected to the anode s through the capacitor C33. The cathode w is connected to the point u through the capacitor C34 and at the same time connected as an output terminal to a load resistor 17.

A means for stabilizing output voltages in load and non-load states of the rectifier circuits 12 to 14 having the above configurations will now be described.

As is well known, when an AC voltage of Ei [V] is generated across the two terminals of the secondary winding W2 of the transformer T, the output voltages in non-load states of the rectifier circuits 12 to 14 are 2n1·Ei [V], 2n2·Ei [V] and 2n3·Ei [V], respectively, where n1, n2 and n3 are numbers of multiplication stages of the rectifier circuits 12 to 14, respectively. It is also well known that when load currents of I1 [A], I2 [A] and I3 [A] are flowed, the output voltages E1 [V], E2 [V] and E3 [V] of the rectifier circuits 12 to 14, respectively, are represented by:

$$E1 = 2n1 \cdot Ei - (2n1^3/3 + n1^2/2 - n1/6) \times I1/(C1 \cdot f) \quad (1)$$

$$E2 = 2n2 \cdot Ei - (2n2^3/3 + n2^2/2 - n2/6) \times I2/(C2 \cdot f) \quad (2)$$

$$E3 = 2n3 \cdot Ei - (2n3^3/3 + n3^2/2 - n3/6) \times I3/(C3 \cdot f) \quad (3)$$

where f is the frequency of the power source A, C1 [F], C2 [F] and C3 [F] respectively are the capacitances of the capacitors constituting the rectifier circuits 12 to 14, and R1 [Ω], R2 [Ω] and R3 [Ω] respectively are the resistances of the load resistors 15 to 17.

Assuming that, the output voltage E1 becomes an output voltage 2n1 Ei in a non-load state upon an increase of the input voltage from Ei to Ei' in equation (1). Then, Ei' can be given by:

$$2n1 \cdot Ei = 2n1 \cdot Ei' - (2n1^3/3 + n1^2/2 - n1/6) \times I1/(C1 \cdot f) \quad (4)$$

Therefore, $$Ei' = Ei + (2n1^2/3 + n1/2 - 1.6)2 \times I1/(C1 \cdot f) \quad (5)$$

Similarly, assuming that the output voltage E2 becomes an output voltage 2n2 Ei in a non-load state upon an increase of the input voltage from Ei to Ei' in equation (2), the following equation is established:

$$2n2 \cdot Ei = 2n2 \cdot Ei' - (2n2^3/3 + n2^3/3 + n2^2/2 - n2/6) \times I2/(C2 \cdot f) \quad (6)$$

Substitution of equation (5) in equation (6) yields the following equation:

$$2n2 \cdot Ei = 2n2 \cdot Ei + n2(2n1^2/3 + n1/2 - 1/6) \times I1/(C1 \cdot f) - (2n2^3/3 + n2^2/2 - n2/6) \times I2/(C2 \cdot f) \quad (7)$$

Equation (7) can be rewritten as:

$$C1/C2 = (2n1^2/3 + n1/2 - 1/6)/(2n2^2/3 + n2/2 - 1/6) \times I1/I2 \quad (8)$$

As apparent from equation (8), when the capacitances C1 and C2 of the capacitors constituting the two rectifier circuits 12 and 13 generating the output voltages E1 and E2 are set at the ratio represented by equation (8), the outputs E1 and E2 can be set to be the same as the respective non-load state voltages only by changing the input voltage in a load state from Ei to Ei'.

This also applies to the two rectifier circuits 13 and 14 generating the output voltages E2 and E3. Therefore, assume that the capacitances C2 and C3 of the capacitors constituting the rectifier circuits 13 and 14 have the relationship as follows:

$$C2/C3 = (2n2^2/3 + n2/2 - 1/6)/(2n3^2/3 + n3/2 - 1/6) \times I2/I3 \quad (9)$$

Then, the load state output voltages E2 and E3 can be set to be the same as the respective non-load state output voltages with a predetermined same input voltage Ei'. Elimination of C2 from equations (8) and (9) yields the following equation:

$$C1/C3 = (2n1^2/3 + n1/2 - 1/6)/(2n3^2/3 + n3/2 - 1/6) \times I1//I3 \quad (10)$$

Therefore, when the capacitances C1 and C3 of the capacitors constituting the two rectifier circuits 12 and 14 generating the output voltages E1 and E3 are set at the ratio represented in equation (10), the load state output voltages E1 and E3 can be set to be the same as the respective non-load state output voltages with the predetermined same input voltage, in the same manner as mentioned above.

Referring to equations (8) to (10), when the stage numbers n1, n2 and n3 are comparatively large, the square terms thereof become sufficiently large compared with the remaining terms. Therefore, equations (8) to (10) can be approximated as:

$$C1/C2 = n1^2/n2^2 \times I1/I2 \quad (11)$$

$$C2/C3 = n2^2/n3^2 \times I2/I3 \quad (12)$$

$$C1/C3 = n1^2/n3^2 \times I1/I3 \quad (13)$$

In other words, the ratio of capacitances of the capacitors of each two rectifier circuits is proportional to the ratio of the squares of the numbers of multiplication stages.

Therefore, the ratios of the capacitances C1 to C3 of the capacitors of the rectifier circuits 12 to 14 are set to be proportional to the ratios of the squares of the stage numbers so that the load-state output voltages E1, E2 and E3 can be the same as those in the non-load state with the same input voltage Ei'. As a result, any one of the output voltages E1, E2 and E3 is detected and the input voltage Ei is controlled in accordance with the detected level of the output voltage. Thus, all of the output voltages E1, E2 and E3 can be easily stabilized at a constant ratio when output terminals of the rectifier circuits are connected in the load-state.

What is claimed is:

1. A multiple output multiple step-up rectifier circuit comprising:
   a power source circuit for generating an AC voltage; and
   a plurality of Cockroft-Walton multiple step-up rectifier circuits connected in parallel with each other to said power source circuit and each constituted by a combination of a plurality of diodes and capacitors of the number corresponding to an arbitrary number of multiplication stages, wherein
   a capacitance ratio of capacitors constituting any two rectifier circuits of said plurality of rectifier circuits is set to be proportional to the ratio of the square of the number of stages of one rectifier circuit to the square of the number of stages of the other rectifier circuit.

2. A circuit according to claim 1, wherein the capacitance ratio of the capacitors of said two rectifier circuits of said plurality of rectifier circuits is set to have the relationship:

$$C1/C2 = n1^2/n2^2 \times I1/I2$$

where C1 is a capacitance of capacitors constituting one of said two rectifier circuits, n1 is the number of multiplication stages of said one of said two rectifier circuits, I1 is the output current of said one of said two rectifier circuits, C2 is the capacitance of capacitors constituting the other of said two rectifier circuits, n2 is the number of multiplication stages of said the other of said two rectifier circuits, and I2 is the output current of said the other of said two rectifier circuits 3. A circuit according to claim 1, wherein the capacitance ratio of the capacitors of said two rectifier circuits of said plurality of rectifier circuits is set to have the relationship:

$$C1/C2 = (2n1^2/3 + n1/2 - 1/6)/(2n2^2/3 - n2/2 - 1/6) \times I1/I2$$

where C1 is the capacitance of capacitors constituting one of said two rectifier circuits, n1 is the number of multiplication stages of said one of said two rectifier circuits, I1 is the output current of said one of said two rectifier circuits, C2 is the capacitance of capacitors constituting the other of said two rectifier circuits, n2 is the number of multiplication stages of said the other of said two rectifier circuits, and I2 is the output current of said the other of said two rectifier circuits.

4. A circuit according to claim 1, wherein the output voltage of said power source circuit varies such that an output from any rectifier circuit of said plurality of rectifier circuits is the same in a non-load state and in a load state.

5. A circuit according to claim 4, wherein the output voltage of said power source circuit varies to satisfy the relation:

$$Ei' = Ei + (2n^2/3 + n/2 - 1/6)/2 \times I/(C \cdot f)$$

where C is the capacitor capacitance of said rectifier circuit, n is the number of multiplication stages of said rectifier circuit, I is the output current of said rectifier circuit, f is the frequency of the output voltage, Ei is the non-load state output voltage of said power source circuit, and Ei' is the load-state output voltage of said power source circuit.

6. A circuit according to claim 2, wherein the output voltage of said power source circuit varies such that an output from any rectifier circuit of said plurality of rectifier circuits is the same in a non-load state and in a load state.

7. A circuit according to claim 6, wherein the output voltage of said power source circuit varies to satisfy the relation:

$$Ei' = Ei + (2n^2/3 + n/2 - 1/6)2 \times I/(C \cdot f)$$

where C is the capacitor capacitance of said rectifier circuit, n is the number of multiplication stages of said rectifier circuit, I is the output current of said rectifier circuit, f is the frequency of the output voltage, Ei is the non-load state output voltage of said power source circuit, and E' is the load-state output voltage of said ower source circuit.

8. A circuit according to claim 3, wherein the output voltage of said power source circuit varies such that an output from any rectifier circuit of said plurality of rectifier circuits is the same in a non-load state and in a load state.

9. A circuit according to claim 8, wherein the output voltage of said power source circuit varies to satisfy the relation:

$$Ei' = Ei + (2n^2/3 + n/2 - 1/6)2 \times I/(C \cdot f)$$

where C is the capacitor capacitance of said rectifier circuit, n is the number of multiplication stages of said rectifier circuit, I is the output current of said rectifier circuit, f is the frequency of the output voltage, Ei is the non-load state output voltage of said ower source circuit, and E' is the load-state output voltage of said power source circuit.

* * * * *